US009948565B2

(12) United States Patent
Zhovnirnovsky et al.

(10) Patent No.: US 9,948,565 B2
(45) Date of Patent: Apr. 17, 2018

(54) METHOD AND IMPLEMENTATION OF ZERO OVERHEAD RATE CONTROLLED (ZORC) INFORMATION TRANSMISSION VIA DIGITAL COMMUNICATION LINK

(71) Applicant: Instart Logic, Inc., Palo Alto, CA (US)

(72) Inventors: Igor Zhovnirnovsky, Newton, MA (US); Mingzhe Li, Sudbury, MA (US); Subhash C. Roy, Lexington, MA (US)

(73) Assignee: Instart Logic, Inc., Palo Alto, CA (US)

( * ) Notice: Subject to any disclaimer, the term of this patent is extended or adjusted under 35 U.S.C. 154(b) by 64 days.

(21) Appl. No.: 14/912,892

(22) PCT Filed: Aug. 18, 2014

(86) PCT No.: PCT/US2014/051563
§ 371 (c)(1),
(2) Date: Feb. 18, 2016

(87) PCT Pub. No.: WO2015/026746
PCT Pub. Date: Feb. 26, 2015

(65) Prior Publication Data
US 2016/0205026 A1 Jul. 14, 2016

Related U.S. Application Data (60) Provisional application No. 61/867,583, filed on Aug. 19, 2013, provisional application No. 61/953,713, filed on Mar. 14, 2014.

(51) Int. Cl.
*H04L 12/26* (2006.01)
*H04L 12/825* (2013.01)
(Continued)

(52) U.S. Cl.
CPC ............ *H04L 47/25* (2013.01); *H04L 43/087* (2013.01); *H04L 47/12* (2013.01); *H04L 47/32* (2013.01); *H04N 21/6373* (2013.01)

(58) Field of Classification Search
CPC ......... H04L 47/25; H04L 47/32; H04L 47/12; H04L 43/087; H04N 21/6373
See application file for complete search history.

(56) References Cited

U.S. PATENT DOCUMENTS 6,687,781 B2 * 2/2004 Wynne .................. H04L 47/525
370/229
8,644,133 B2 * 2/2014 Diab .................. H04L 12/40136
370/220
(Continued)

FOREIGN PATENT DOCUMENTS

WO WO-2007024844 A2 3/2007

OTHER PUBLICATIONS

McKinley et al., An Experimental Study of Adaptive Forward Error Correction for Wireless Collaborative Computing, Proceedings of Saint 2001 Symposium on Applications and the Internet, San Diego, CA, USA, IEEE Computer Society, Los Alamitos, CA, USA, Jan. 8, 2011.

*Primary Examiner* — Phuc Tran
(74) *Attorney, Agent, or Firm* — Van Pelt, Yi & James LLP (57) ABSTRACT

A system and process to adjust the transmission rate of data packets by measuring (continuously or at pre-set intervals) certain elements and variables to reliably measure the current transmission rate and gaps (wasted space) to determine the channel utilization. These measurements are used to adjust the transmission rate of data in real time. The measurement of these variables reliably predicts the optimum transmission rate and can adjust the same to both efficiently transmit data and avert network congestion. A communication processing device comprising one or more processors operable to measure inter-packet gap times to estimate and utilize channel capacity changes during transmission.

20 Claims, 8 Drawing Sheets

(51) Int. Cl.
*H04L 12/801* (2013.01)
*H04L 12/823* (2013.01)
*H04N 21/6373* (2011.01)

(56) References Cited

U.S. PATENT DOCUMENTS

| | | |
|---|---|---|
| 2004/0165527 A1 | 8/2004 | Gu |
| 2006/0159098 A1 | 7/2006 | Munson |
| 2006/0251010 A1 | 11/2006 | Ramakrishnan et al. |
| 2008/0247410 A1 | 10/2008 | Ilnicki |
| 2008/0304413 A1 | 12/2008 | Briscoe |
| 2009/0097442 A1* | 4/2009 | Diab ............ H04L 12/40136 370/329 |
| 2009/0225773 A1* | 9/2009 | Winter .............. H04L 69/24 370/437 |
| 2010/0191525 A1 | 7/2010 | Rabenko |
| 2012/0236878 A1 | 9/2012 | Shafai |

* cited by examiner

METHOD AND IMPLEMENTATION OF ZERO OVERHEAD RATE CONTROLLED (ZORC) INFORMATION TRANSMISSION VIA DIGITAL COMMUNICATION LINK

CROSS-REFERENCE TO RELATED APPLICATIONS/INCORPORATION BY REFERENCE

This patent application makes reference to, claims priority to and claims benefit from U.S. Provisional Patent Application Ser. No. 61/867,583 entitled METHOD & APPARATUS FOR IMPROVING THE PERFORMANCE OF TCP AND OTHER NETWORK PROTOCOLS IN A COMMUNICATIONS NETWORK USING PROXY SERVERS, filed on Aug. 19, 2013 and U.S. Provisional Patent Application Ser. No. 61/953,713 entitled METHOD & IMPLEMENTATION OF ZERO OVERHEAD RATE CONTROLLED INFORMATION TRANSMISSION VIA DIGITAL COMMUNICATION LINK, filed on Mar. 14, 2014. Each of the applications are hereby incorporated herein by reference in its entirety.

FIELD OF INVENTION

The invention relates to a method and system to regulate the transmission rate of data packets in a wireless system.

BACKGROUND

The disclosure includes aspects of a packet transmission apparatus, a communication system and a program.

Data is communicated over both wired and wireless communication systems. However, data communication over wireless channels has become increasingly common. For example, Wi-Fi is used for wireless communication for connections based on the IEEE 802.11 standard. Many other wireless channels may be used such as WiMAX, 3G, mesh networks, or community networks, to name a few.

Both wired and wireless communication channels can be lossy. Wireless channels may be lossy such that data may often be lost during transmission due to any one of a variety of conditions. For example, weather conditions may be such that the transmission of communication data may be impaired. Likewise, there may be interference to data transmission from a variety of causes such as interference from other devices transmitting on the same channel.

Even though the wired channel's transmission medium is less susceptible to external interference, the active devices deployed in wired networks possess finite resources that contribute to transmission losses if overwhelmed by multiple, uncorrelated transmission sources. Any of these factors may contribute to additional loss in data packet transmission or increased data packet erasure rates.

Many data communications systems employ end-to-end transport protocols, such as Transmission Control Protocol (TCP), where data communication is provided across interconnected networks or devices. TCP is utilized in communications networks in order to provide a mechanism for reliability, flow control, and congestion control. In such end-to-end transport protocols, data to be transmitted is segmented into packets of data. The data packets are transmitted to a receiver where the packets are verified and reassembled into the original (data) message. An acknowledgement (ACK) is returned from the receiver to indicate that the data packets were received.

TCP uses a number of mechanisms to achieve high performance and avoid congestion collapse, where network performance can fall by several orders of magnitude. These mechanisms control the amount of data entering the network, keeping the data flow below a rate that would trigger collapse. They also yield an approximately max-min fair allocation between flows. Data reception acknowledgments, or lack of data reception acknowledgments, are used by senders to infer network conditions between the TCP sender and receiver. Coupled with timers, TCP senders and receivers can alter the behavior of the flow of data. This mechanism is more generally referred to as congestion control and/or network congestion avoidance.

Modern implementations of TCP contain four intertwined algorithms: Slow-start, congestion avoidance, fast retransmit, and fast recovery (RFC 5681). In addition, senders employ a retransmission timeout (RTO) that is based on the estimated round-trip time (or RT) between the sender and receiver, as well as the variance in this round trip time. The behavior of this timer is specified in RFC 6298. There are subtleties in the estimation of RTT. For example, senders must be careful when calculating RTT samples for retransmitted packets; typically they use Karn's Algorithm or TCP timestamps (see RFC 1323). These individual RTT samples are then averaged over time to create a Smoothed Round Trip Time (SRTT) using Jacobson's algorithm. This SRTT value is used as the round-trip time estimate.

In data communications, flow control is the process of managing the rate of data transmission between two nodes to prevent a fast sender from overwhelming a slow receiver. It provides a mechanism for the receiver to control the transmission speed, so that the receiving node is not overwhelmed with data from transmitting node. Flow control should be distinguished from congestion control, which is used for controlling the flow of data when congestion has actually occurred. Flow control mechanisms can be classified by whether or not the receiving node sends feedback to the sending node.

Flow control is important because it is possible for a sending computer to transmit information at a faster rate than the destination computer can receive and process the information. This can happen if the destination computer has a heavy traffic load in comparison to the sending computer, or if the destination computer has less processing power than the sending computer. Data submitted for transmission into any given digital communication link is usually not rate controlled. This means that data to be transmitted is sent into the link as soon as it is ready for transmission. Then the reliable transport layer protocols (analogous to TCP) of the ISO stack are responsible for reacting to the data loss and regulating the average transmission rate with coarse adjustment of the amount of data being sent in response to the feedback about losses. This behavior results in gross underutilization of the available channel capacity.

When everything is wired, channel capacity is less varied. However with wireless communication, channel capacity varies and is difficult to predict. Conventional techniques to predict channel capacity have been inaccurate because they did not take into account short-term changes in the maximum available channel capacity and its interaction with the long-term average channel capacity and reacted slowly to these changes. Currently use of a wireless channel widely varies and in order to assure reliable transport of packets, the packet transmission rate overcompensates by often slowing itself down thus underutilizing the channel capacity. This inefficiency results in lost or wasted bandwidth for the users.

Therefore there is a need to more efficiently utilize the capacity of wireless communication channels.

BRIEF SUMMARY OF THE INVENTION

Disclosed is a process of regulating the transmission rate with which data is submitted to communication link in order to minimize the transmitted data losses and avert network congestion that may cause losses to other data transmitted over the same network. In the past, using TCP protocols, data was sent at a high rate and then when loss occurred, the rate was cut in half and this process was repeated until the data was received and then the transmission rate was slowly increased incrementally (e.g. 10% of the window size) until the there was more loss.

The disclosure is directed to a system and process to adjust the transmission rate of data packets by measuring (continuously or at pre-set intervals) certain elements and variables to reliably measure the current transmission rate and gaps (wasted space) to determine the channel utilization. These measurements are used to adjust the transmission rate of data in real time. The measurement of these variables reliably predicts the optimum transmission rate and can adjust the same to both efficiently transmit data and avert network congestion.

The present method is designed to finely adjust the data transmission rate by monitoring channel utilization in real time instead of data losses as an indicator of the available channel capacity. This is accomplished through regularly or continuously measuring, calculating and monitoring several key indicators. The method includes measuring the long term and short term average and minimum Inter Packet Gap (IPG). The long-term minimum IPG tracks the changes of the maximum capacity of the link; the long term average IPG tracks the historical available bandwidth and short term IPG tracks the currently available bandwidth in the channel.

These long term and short-term measurements are used to adjust the transmission rate of data in real time. The measurement of these variables in connection with processing algorithms reliably predicts the optimum transmission rate and can adjust the same to both efficiently transmit data and avert network congestion. Thus, rather than waiting for a timer to expire to determine that a packet is lost caused by network congestion before reducing a sender's transmission rate, the sender can reduce the sending transmission rate when detecting the IPG changes at the receiver side, which happens before the queue overflow drops caused by the congestion (or expiration of a timer). Further, rather than probing slowly for more bandwidth when extra capacity becoming available, the sender can increase the sending rate when detecting the IPG changes at the receiver side immediately after crossing traffic disappeared.

The present invention also comprises a communication processing device comprising one or more processors operable or configured to transmit to an end-point (device), a rate change report comprising transmission information of transmission data when a transmission rate of the transmission data for the end-point is changed; store the transmission information of the transmission data in a storage unit (coupled to the communication processing device) when the transmission rate is changed; transmit to the end-point, a sender report comprising the transmission information of the transmission data on a regular basis separately from the rate change report; receive from the end-point, an extended receiver report comprising the transmission information, such that the extended receiver report is transmitted from the end-point in response to the end-point receiving the sender report; and control the transmission rate of the transmission data for the end-point, based on the transmission information stored in the storage unit and the transmission information in the extended receiver report received from the end-point. In preferred embodiments, the transmission information comprises a transmission time and the transmission rate of the transmission data. In preferred embodiments one or more processors are operable or configured to store the transmission information of the transmission data each time the transmission rate is changed, and control the transmission rate by comparing the transmission information stored each time and the transmission information in the extended receiver report received from the end-point. In preferred embodiments, the rate change report comprises a flag indicating a change of the transmission rate. In preferred embodiments the sender report is transmitted to the end-point at regular time intervals.

Depending on the embodiment, various elements are used for measurement in the system to adjust and optimize the rate of packet delivery including:

IPG—Inter Packet Gap. The time interval between the last bit of a first packet and the last bit of a subsequent packet RTT—Round-trip time. The time interval that it takes for data to propagate from one end of a communication line to another end and back to the signal-originating end. May be used in a timer to control-originated end's transmission rate.

$T_{term}$—predefined time period (or term) used as a basis for calculating periodic averages. The term can be specified in number of IPG samples or by direct value in time in the unit of measured RTT.

$IPG_{min}$—the smallest IPGs observed by the receiving end of the communication channel during the sampling interval $T_{term}$ and corresponds to a maximum available channel capacity available for a given channel $IPG_{avg}$—the average over predefined sampling interval $T_{term}$ of all the IPGs observed by the receiving end of the communication channel and corresponds to a currently available channel capacity taking into account all other traffic transmitted via the same channel and therefore competing for the same channel resources.

$\overline{IPG_{min}}$—the long-term average (using Exponential Weighted Moving Average (EWMA) with configurable windows size) of smallest IPGs observed in each term ($IPG_{min}$) by the receiving end of the communication channel.

$\overline{IPG_{avg}}$—the long-term average (using EWMA with configurable windows size) of average IPGs observed in each term ($IPG_{avg}$) by the receiving end of the communication channel.

$IPG_{tx}$—the calculated value of the transmitting IPG to replace currently used value to maximize the network utilization and avert network congestion for a given channel The packets used for measurement include the following flags: Rate Control Qualified (RCQ), and Rate Control ACK (RCA).

The RCQ flag (Q-bit [1 bit]) indicates the packet is qualified for RC computation on receiver side. Bit value: 1=QUALIFIED 0=NOT_QUALIFIED.

The RCA flag (A-bit [1 bit]) indicates the sender received rate change request from receiver and applied the new sending rate. The A-bit is set to the same value continuously in all transmitted packets, and toggled only if the sending rate is changed. Initial bit value: A-bit=0.

The receiver calculates the short-term average ($IPG_{avg}$) and short-term minimum ($IPG_{min}$) with only qualified IPGs, i.e. with Q-bit=1. The receiver resets the long-term averages ($\overline{IPG_{min}}$ and $\overline{IPG_{avg}}$) when detecting the A-bit toggling event.

One preferred embodiment the method includes:

(1) Continuously calculating the $\overline{IPG_{min}}$ and $\overline{IPG_{avg}}$; (2) Calculates $IPG_{avg}$ for every $T_{term}$; (3) Comparing currently measured $IPG_{avg}(t)$ with long term average IPG, $\overline{IPG_{avg}}(t-1)$ and adjust new sending IPG, $IPG_{tx}$, according to the result:

$IPG_{avg}(t) < \overline{IPG_{avg}}(t-1)$—decrease $IPG_{tx}$ (increase transmit rate)

$IPG_{avg}(t) > \overline{IPG_{avg}}(t-1)$—increase $IPG_{tx}$ (decrease transmit rate)

$IPG_{avg}(t) = \overline{IPG_{avg}}(t-1)$—decrease $IPG_{tx}$ (increase transmit rate) unless $IPG_{avg}(t)$ is already near the $\overline{IPG_{min}}(t-1)$, which is the minimum available IPG (maximum capacity)

In a second embodiment the method:

(1) Continuously calculating the $\overline{IPG_{avg}}$; (2) Calculates the $IPG_{avg}$ for every $T_{term}$; (3) Calculates the sending IPG, $IPG_{tx}$ as $IPG_{tx} = (1+p) \times \overline{IPG_{avg}}(t-1)$, where p is pre-defined coefficient for the aggressiveness level of probing for available transmitting rate; (4) Requests a new sending rate from transmitting end of the link; and (5) Repeats the (1-4) steps for as long as link remains active The coefficient "p" is defined as 0≤p≤1 (where p is more than or equal to 0 or less than or equal to 1).

In the first embodiment, the values are calculated based on the moving average to send the source system a message whether to increase or decrease the sending rate to reach the maximum sending rate (minimum IPG) to optimize the system. In the second embodiment, rather than continuously adjust, the source system adjusts at a fixed time period (e.g. 10 microseconds). Both methods provide significant advantages over prior art methods including adaptation to real-time conditions such as network capacity changes due to interference, mobility, congestion, jitter, and microbursts.

Additional features and advantages are described herein, and will be apparent from, the following Detailed Description and the figures.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In a preferred embodiment, the present invention is implemented as an independent method that can be incorporated into different layers of the computer system's communication protocol stack (e.g. TCP/IP protocol stack). The present inventive method incorporates a rate control algorithm that can be integrated into any packet switching communication network system with bi-directional communications. The algorithm (i.e. ZORC) can be placed at the transport layer (layer 4), or the IP layer (layer 3) or the MAC layer (layer 2) of a communication protocol stack where rate control can be applied. Regardless of the placement, the functionality of ZORC does not change and interface details required for attachment to a specific System Communication Stack (SYSTEM COMM STACK) may be adjusted accordingly.

Figure 1:
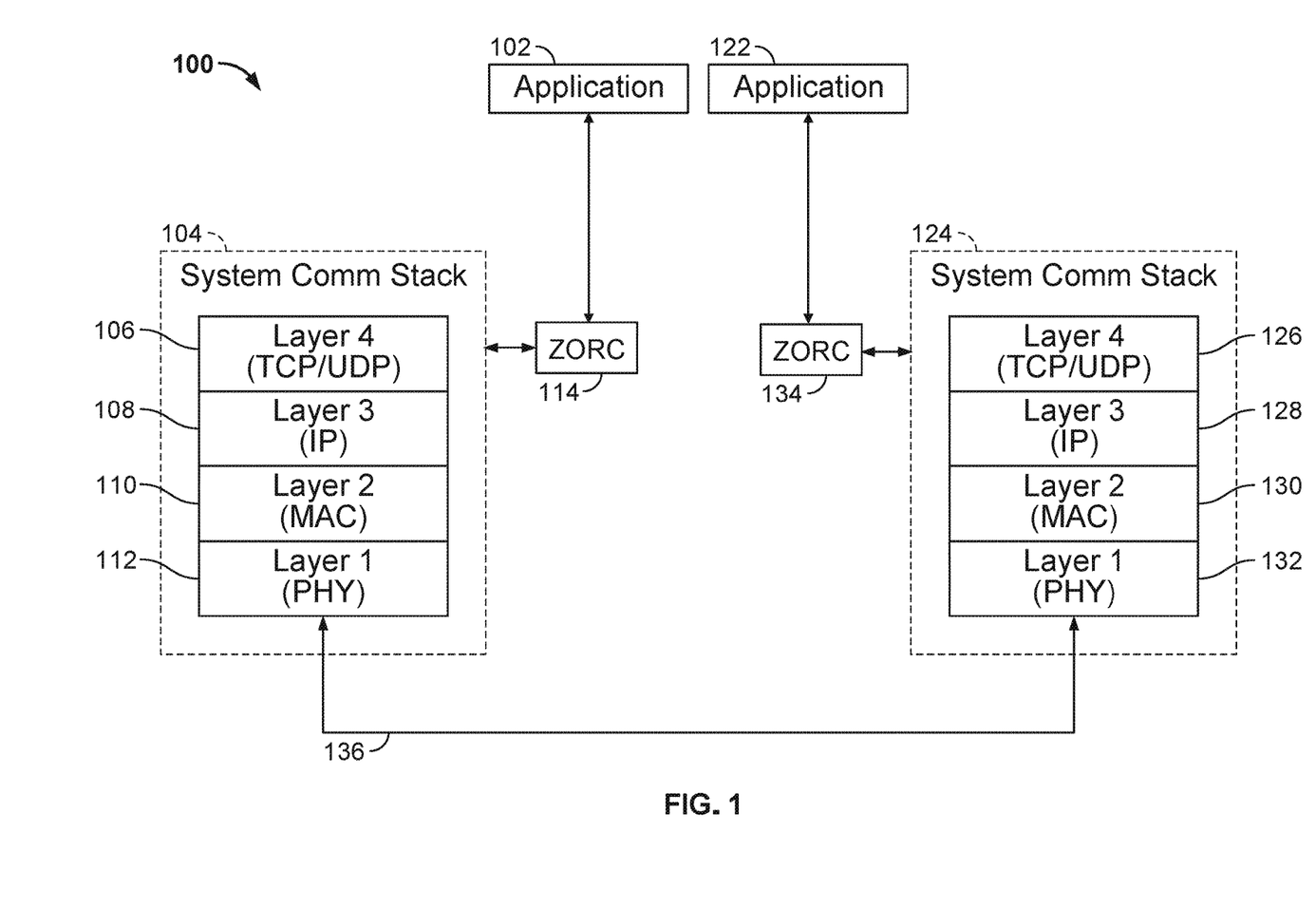
FIG. 1 shows a schematic view of a preferred embodiment of the inventive system where the ZORC process is deployed in a two-node communication system.

FIG. 1 shows a schematic view of a preferred embodiment of the inventive system 100, which is a two-node system. A node is a computing device that communicates with one or more other nodes in a communication system or network. One node comprises an application 102, system (protocol) communication stack 104. SYSTEM COM STACK 104 comprises layer 4 (TCP/UDP) 106, layer 3 (IP) 108, layer 2 (MAC) 110, layer 1 (PHY) 112 and a ZORC process 114. In a preferred embodiment, ZORC 114 is positioned layer 4 106 and layer 3 108. The second node mirrors the first node and comprises an application 122, system comm stack 124. SYSTEM COM STACK 124 comprises layer 4 (TCP/UDP) 126, layer 3 (IP) 128, layer 2 (MAC) 130, layer 1 (PHY) 122 and a ZORC process 134, referred herein as ZORC. In a preferred embodiment, ZORC 134 is positioned in layer 4 126 and in layer 3 128 System stack 104 of the first node and system stack 124 of the second node are connected by a communication channel 136. In some embodiments the ZORC process is connected to a single application while in other embodiments it is connected to a multitude of applications that receive/transmit data from/into communication channel.

Figure 2:
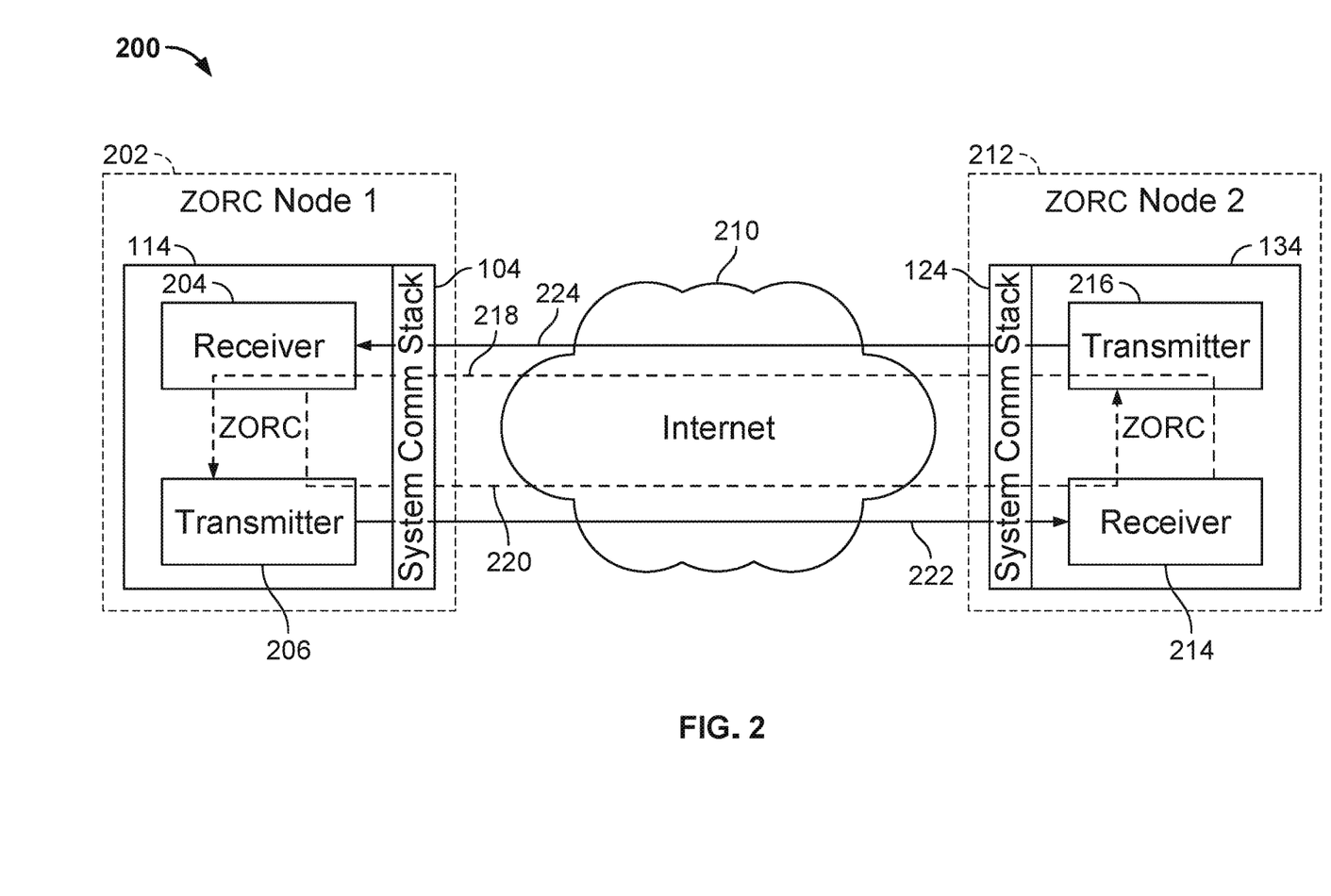
FIG. 2 shows a system level view where the ZORC process is deployed in a two-node network functional block diagram demonstrating symmetrical architecture of the system.

FIG. 2 shows a system 200 level view of a preferred embodiment of the present invention, showing the ZORC process rate control method in more detail, where the inventive method is deployed in a closed loop two node network with functional block diagrams demonstrating the symmetrical architecture of the system 200. Specifics of the ZORC process interaction with the system communication stacks are removed for clarity without reducing the generality of the description. The ZORC process adjusts the transmission rate of data packets by measuring (continuously or at pre-set intervals) certain elements and variables namely, measuring the long term and short term average and minimum Inter Packet Gap (IPG). The long-term minimum IPG tracks the changes of the maximum capacity of the link; the long term average IPG tracks the historical available bandwidth and short term IPG tracks the currently available bandwidth in the channel. This reliably measures the current transmission rate and gaps (wasted space) to determine the channel utilization. These measurements are used to adjust the transmission rate of data in real time. The measurement of these variables reliably predicts the optimum transmission rate and can adjust the same to both efficiently transmit data and avert network congestion.

ZORC process rate control method (shown on each node 202 and 212) as elements 114 and 134 are positioned on each end of a communication link. ZORC process rate control system 200 comprises two identical ZORC nodes. ZORC node 1 (ZN1) 202 comprises a receiver 204 and a transmitter 206. ZN1 202 is connected to system communication stack 104 that is coupled to the system communication stack 124 on ZORC node 2 (ZN2) 212 through the Internet 210. Similarly ZORC Node 2 (ZN2) 212 comprises a receiver 214 and a transmitter 216. ZN2 212 is connected to system communication stack 124 that is coupled to the system communication stack 104 on ZN1 202 through the Internet 210. Each data transmission direction is originated at a ZORC transmitter 206 or 216 on the sending node and terminated respectively at ZORC receiver 204 and ZORC receiver 214 on the receiving node. The link in opposite to the data transmission direction is used to transfer control information to this link's transmitter, i.e. for data originated from transmitter 216 to the receiver 204. To complete the closed loop feedback system, ZORC needs to send information from the receiver end points 204 and 216 to their corresponding transmitters 216 and 206. Feedback information from receiver 214 is passed to transmitter 206 via feedback link 218. Feedback information from receiver 204 is passed to transmitter 216 via feedback link 220. Each data transmission direction i.e. from ZN1 202 to ZN2 212 or from ZN2 212 to ZN1 202 is controlled separately and independently via data links 222 and 224. The feedback system allow measurement of the IPG in connection with processing algorithms, reliably predicts the optimum transmission rate and can adjust the same to both efficiently transmit data and avert network congestion. Thus, rather than waiting for a timer to expire to determine that a packet is lost caused by network congestion before reducing a sender's transmission rate, the sender can reduce the sending transmission rate when detecting the IPG changes at the receiver side, which happens before the queue overflow drops caused by the congestion (or expiration of a timer). Further, rather than probing slowly for more bandwidth when extra capacity becoming available, the sender can increase the sending rate when detecting the IPG changes at the receiver side immediately after crossing traffic disappeared.

Figure 3:
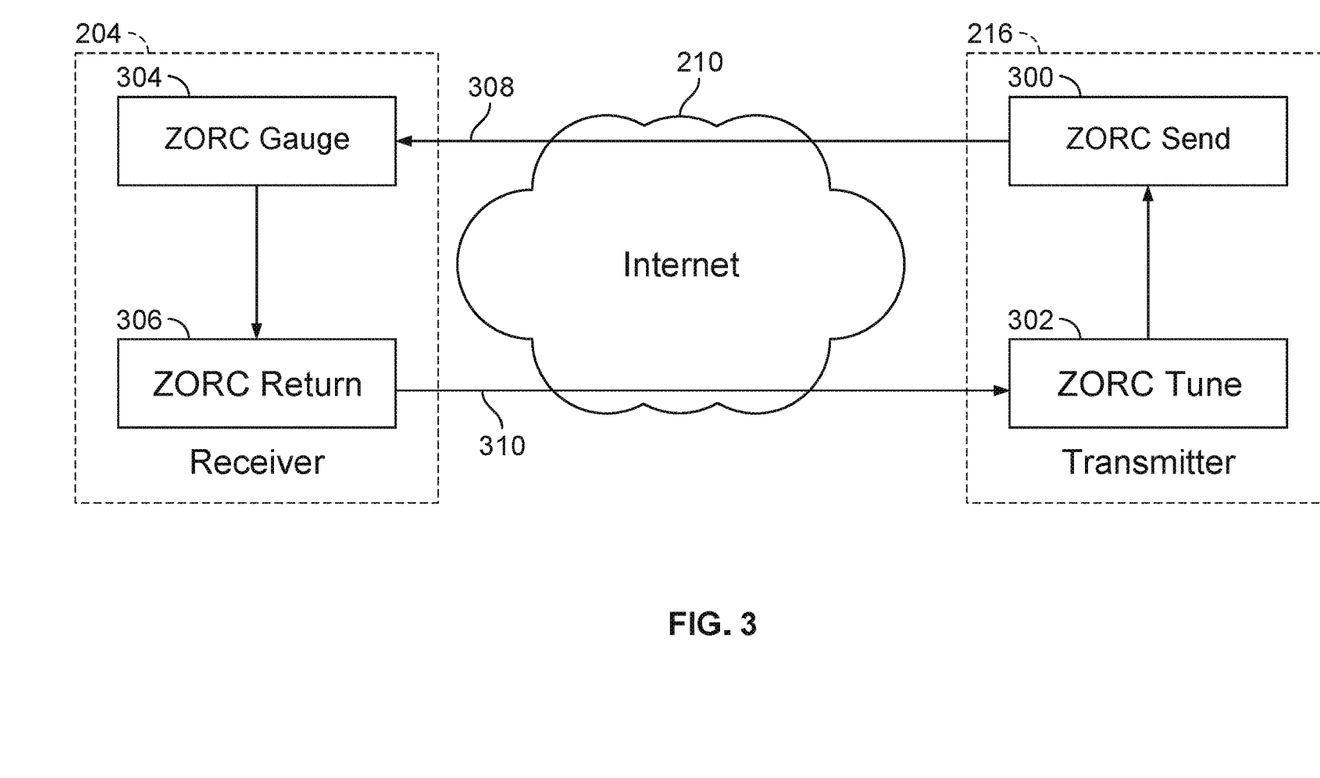
FIG. 3 shows a more detailed view of the system of FIG. 2, detailing a ZORC TRANSMITTER/RECEIVER pair.

FIG. 3 shows a functional block diagram of a preferred embodiment of a single ZORC TRANSMITTER 216/RECEIVER 204 pair with specific functional details. ZORC TRANSMITTER 216 comprises ZORC Send (ZSEND) function 300 and ZORC Tune (ZTUNE) function 302 implemented by processors a computing device which is the ZORC TRANSMITTER 216. ZORC receiver 204 comprises ZORC Gauge (ZGAUGE) function 304 and ZORC Return (ZRETURN) function 306 implemented by processors a computing device which is the ZORC RECEIVER 204.

ZGAUGE 304 processes the IPG and other transmission characteristics of the data transmitted on data channel 308 and provides control information in conjunction with ZRETURN 306 to ZTUNE 302 over 310 which is relayed to ZSEND 300 to control is transmission rate.

The ZORC nodes (ZN1 202 and ZN2 212) are exchanging control information using reserved fields in DATA and ACK packets. ZORC is a passive, non-intrusive rate control algorithm that does not require any active probing traffic (e.g. training sequences) and does not cause any network overhead (no extra packets).

ZORC has a closed control loop with the following five steps, namely,

1) The transmitter transmits data packets equally spaced in time. In preferred embodiments, ZORC uses the following criteria to determine appropriate packets to be used for ZORC inter packet gap measurements:

a) meet a minimum length (RCQ_Len) which defaults to the MTU (max transfer unit) size and is usually configured by the system (e.g. for IP packets typically set at 1500 bytes) and b) does the sending IPG match the configured IPG. Upon meeting the Step a criteria, the ZORC algorithm selectively marks the packets that can be used for inter packet gap measurements. These are marked with a Q-bit (rate controlled qualified bit, as described in, but not limited to such description in, the present disclosure) with a value of 1.

2) The receiver receives data packets with varying packet inter arrival time intervals and uses the marked packets to compute the IPGs required by the ZORC algorithm.

3) The ZORC algorithm estimates the next IPG to be used by the transmitter by using the receiver side measurements as noted in the previously defined terms.

4) The new sending IPG, $IPG_{tx}$ is communicated back to the transmitter using conventional TCP acknowledgement packets, or dedicated rate control packets.

5) The transmitter adjusts the sending IPG based on receiver's new requested IPG and communicates the rate change to the receiver by setting the rate controlled acknowledgment flag (A-bit) to 1. These steps are repeated continuously while the link is active.

In preferred embodiments, the long term and short term average Inter Packet Gap (IPG) variable which track the historical available bandwidth and track the currently available bandwidth in the channel are calculated using a "weighted average" and specifically an exponential weighted moving average. An Exponential Moving Average (EMA), also known as an Exponentially Weighted Moving Average (EWMA) is a type of infinite impulse response (IIR) digital filter that applies weighting factors that decrease exponentially. The weighting for each older datum decreases exponentially, never reaching zero. Exponential smoothing was first suggested by Robert Goodell Brown in 1956, and then expanded by Charles C. Holt in 1957 (both incorporated by reference). The IPG data is smoothed use a smoothing function, implemented by one or more processors of the communications system, based on a moving average to reduce oscillations and achieve stable tracking of capacity. Smoothing data allows a finer as opposed to coarse transition in the data rate avoiding overwhelming the receiver and potentially causing packet loss. The formulation below, which is the one commonly used, is attributed to Brown and is known as "Brown's simple exponential smoothing".

The simplest form of exponential smoothing is given by the formulae:

$$s_1 = x_0$$

$$s_t = \alpha x_{t-1} + (1-\alpha) s_{t-1} = s_{t-1} + \alpha(x_{t-1} - s_{t-1}), t > 1$$

where $\alpha$ is the smoothing factor, and $0 < \alpha < 1$. In other words, the smoothed statistic $s_t$ is a simple weighted average of the previous observation $x_{t-1}$ and the previous smoothed statistic $s_{t-1}$. The term smoothing factor applied to a here is something of a misnomer, as larger values of $\alpha$ actually reduce the level of smoothing, and in the limiting case with $\alpha=1$ the output series is just the same as the original series (with lag of one time unit). Simple exponential smoothing is easily applied, and it produces a smoothed statistic as soon as two observations are available.

When calculating the short-term minimum and average IPG values, the receiver filters by 1) the current maximum rate supported by the Network Interface Card (NIC) or 2) a pre-defined rate to exclude the IPGs that are out of range by the end host Operating System (OS). i.e. discard IPGs if: IPG<MTU*8/(NIC_Rate). For example, for MTU=1350 bytes and NIC_Rate=100 Mbps, the Receiver discards all IPG<1350*8/100M=108 us.

When using multiple RTTs as measurement period T, the receiver uses the long-term smoothed RTT (SRTT) computed from RTTs sampled from keep-alive messages using Exponential Weighted Moving Average (EWMA) with configurable windows size ($n_{rtt}$).

$$SRTT_i = (1-k) \times SRTT_{i-1} + k \times RTT_i$$

Where $k = \dfrac{2}{n_{rtt}+1}, n_{rtt} > 1$ and $n_{rtt}$ is configurable and $RTT_i$ is the $i^{th}$ sample The receiver computer tracks the long-term average ($\overline{IPG_{avg}}$) and long-term min ($\overline{IPG_{min}}$) IPG values using EWMA with configurable windows size (n) using the follow formulae.

$$\overline{IPG_{min}}(t) = (1-k) \times \overline{IPG_{min}}(t-1) + k \times IPG_{min}(t)$$

$$\overline{IPG_{avg}}(t) = (1-k) \times \overline{IPG_{avg}}(t-1) + k \times IPG_{avg}(t)$$

Where $k = \dfrac{2}{n_{ipg}+1}, n_{ipg} > 1$ and $n_{ipg}$ is configurable and $IPG_{min/avg}(t)$ is the $IPG_{min/avg}$ measured in the current period $T_{term}$.

Figure 4:
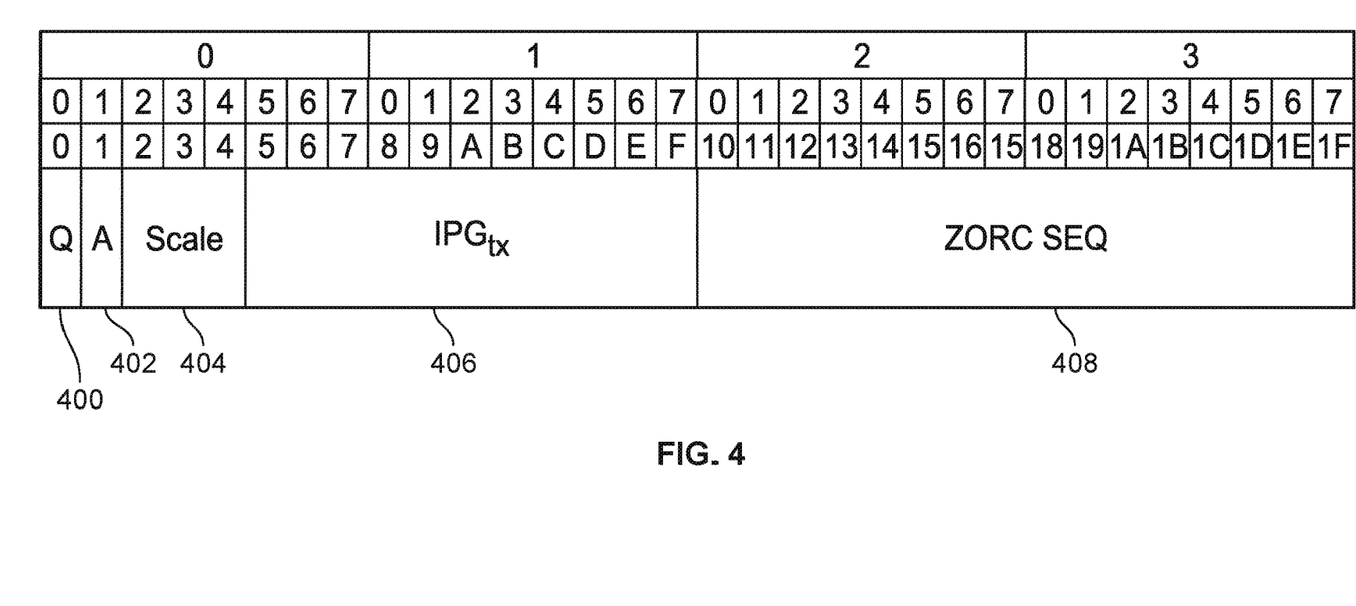
FIG. 4 shows a preferred embodiment of a ZORC packet header arrangement.

FIG. 4 shows a preferred embodiment of a ZORC packet header format designed to transfer control information between ZORC nodes. The format of the header enables usage within packet formats such as TCP, UDP, IP, MAC, or any proprietary packet depending in which layer the ZORC process is implemented. In this embodiment ZORC packet header reserves 32 bits to the other node (either receiving or transmitting) of the link. Specifically header bits are arranged as follows (bits are numbered using customary hexadecimal notation):

Bit 0x00—Rate Control Qualified flag, Q-bit 400 used to validate the packet for rate measurement by ZORC Gauge function 304.

Bit 0x01—Rate Control ACK flag, A-bit 402 used to qualify the measured rate information by ZORC Gauge function 304.

Bit 0x02 to 0x04—scale factor 404 to be applied to $IPG_{tx}$ to calculate actual requested IPG in microseconds. Used by ZTUNE 302 on a transmitting end of the link.

Bits 0x05 through 0x0F—10 bits to represent $IPG_{tx}$ 406 request sent to ZORC Transmitter 240 by ZORC Receiver 230

Bits 0x10 through 0x1F—16 bit value of ZORC serial sequence number 408 assigned to every transmitted packet. More specifically, this information comprises:

Bit 0x00: Q-bit 400, Rate Control Qualified (RCQ) flag. Modified by ZORC transmitter 206 or 216. This bit is set to 1 if the current packet was transmitted by ZORC transmitter 206 or 216 at the specified sending IPG time. If the current packet's transmission IPG is longer than specified sending IPG this bit is set to 0.

Bit 0x01: A-bit 402, Rate Control ACK (RCA) flag. Modified by ZORC transmitter 206 or ZORC transmitter 216. This bit is toggled every time the ZORC transmitter is replacing current sending rate to a new one, i.e. packets transmitted between the two rate change requests are marked with the same A-bit value.

Bit 0x02 through Bit 0x04: new rate request scale 404 bit field. Modified by ZORC receiver. This field presents exponent $4^{scale-1}$. Scale 404 is assigned values from 1 to 7 by ZORC receiver.

Bit 0x05 through Bit 0x0F: $IPG_{tx}$ 406. Modified by ZORC receiver. Carries non-scaled value of new IPG to be used for subsequent transmissions. The actual requested IPG is calculated as $$IPG = 4^{scale-1} \times IPG_{tx}$$

Bit 0x10 through Bit 0x1F: ZORC SEQ 408. ZORC sequence number is incremented by 1 for each subsequently sent packet and wrap around after reach the maximum number ($2^{16}-1=65535$). ZORC SEQ 408 is used along with Q-bit 400 for validation of the current packet for the purpose of estimation of the available channel bandwidth.

As shown in FIG. 3, ZORC Tune (ZTUNE) algorithm 302 closes the control loop by receiving the new IPG information from ZORC Return (RETURN) algorithm 306 and updating operative fields for ZORC Send (ZSEND) algorithm 300. The updated sending IPG is then processed in ZORC Gauge (ZGAUGE) algorithm 304 to trigger another round of ZORC control. While FIGS. 5-8 depict the ZORC process deployed in layer 4 (TCP/UDP) the ZORC process could be implemented at any layer in the communication stack.

Figure 5:
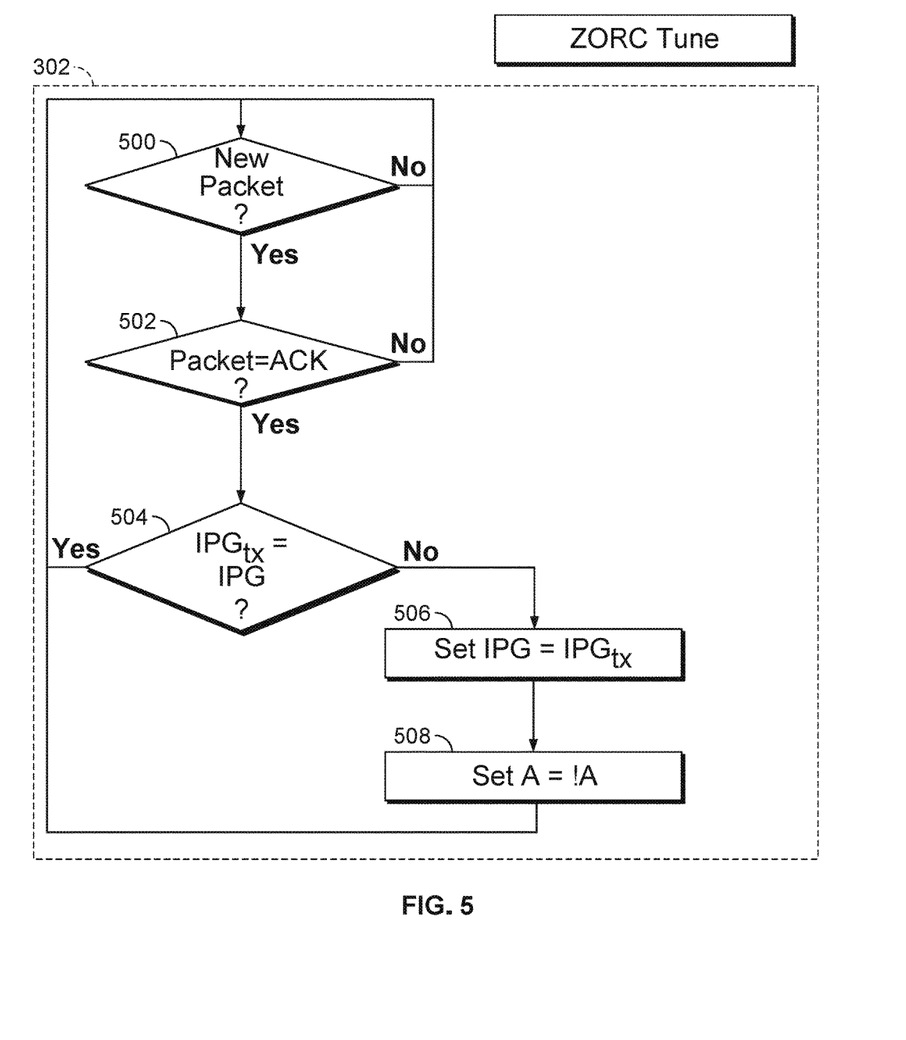
FIG. 5 shows a preferred embodiment of the ZORC TUNE algorithm used in the preferred embodiment of FIG. 3.

FIG. 5 details flowchart used by ZTUNE 302 algorithm. The function of the tuning process is to modify transmitting IPG if necessary based on feedback information.

1. In Step 500 ZORC Tune 302 waits for arrival of the new ingress packet. If one arrives, ZORC Tune 302 process moves to
2. Step 502 to verify if the packet is carrying IPG information in the header as shown in FIG. 4. If it is not carrying IPG information, ZORC Tune 302 returns to Step 500. If it is carrying IPG information, ZORC Tune 302 moves to
3. Step 504 to check if the new IPG is different from $IPG_{tx}$. If $IPG_{tx}$=IPG, ZORC Tune moves back to Step 500 without updating IPG information in local storage. If $IPG_{tx}$ does not=IPG, ZORC Tune moves to
4. Step 506 where it updates the locally stored value of IPG with the newly received value. Then it unconditionally moves to
5. Step 508 to update the locally stored value of the A-bit by toggling the currently stored value A. After this ZORC Tune returns to Step 500 to wait for the next ingress packet.

Figure 6:
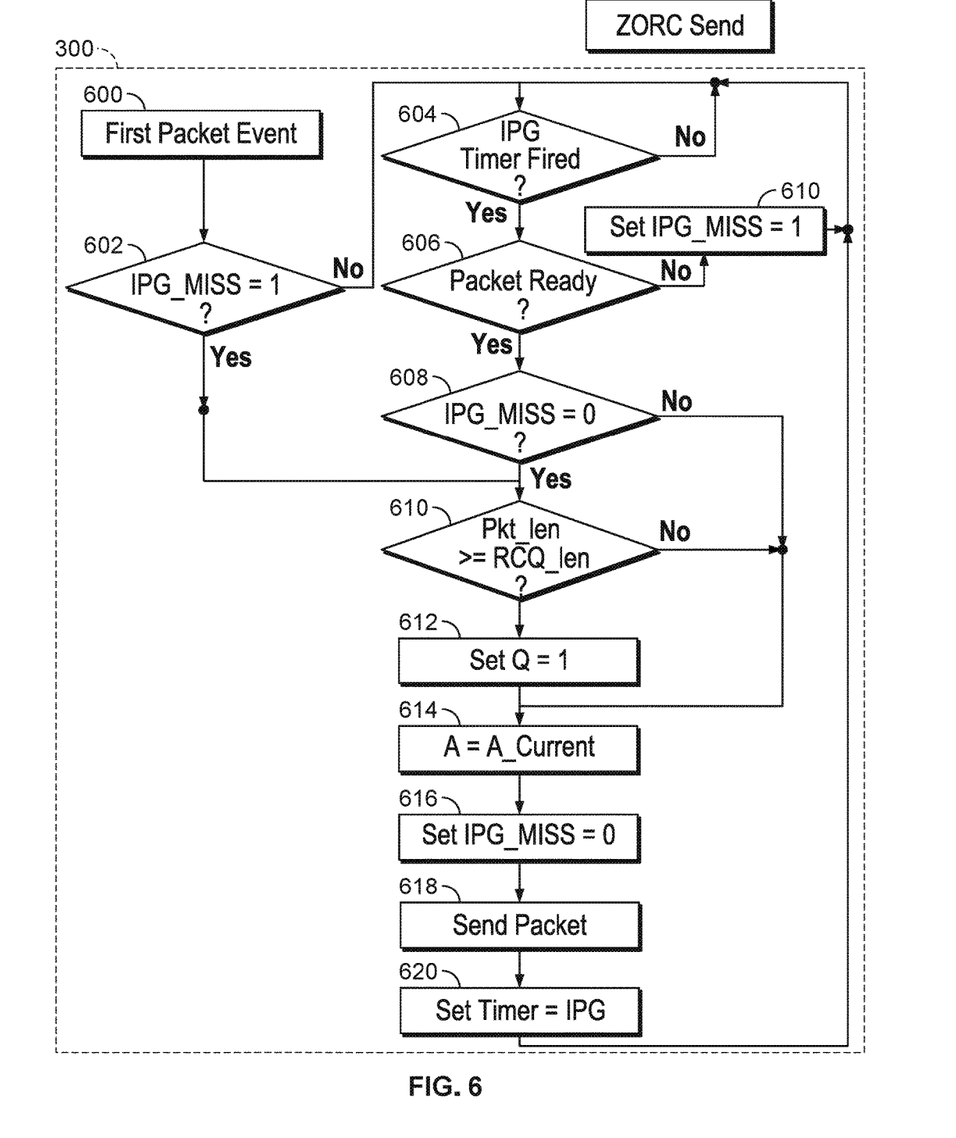
FIG. 6 shows the detailed steps of the ZORC Send process shown in FIG. 3.

FIGS. 2 and 3 shows ZORC functional architecture and data flow arrangement between ZORC transmitter and ZORC receiver. In preferred embodiment the data is sent by ZORC Send 300 located in ZORC transmitter 216 via data channel 308 to ZORC Gauge 304 located in ZORC receiver 204. The data packets are spaced by ZORC Send 300 using IPG value stored in ZORC Send 300. FIG. 6 shows flow chart of ZORC Send 300:

1. ZORC Send 300 is used to send the IPG information across the Internet using link 308. ZORC Send algorithm 300 waits for one of the two possible events to trigger a sequence that results in sending data packet to ZORC Gauge 304 process on the other end of the communication channel 308. They come through either "FIRST PACKET EVENT" 600 or "IPG TIMER FIRED" 604. The "FIRST PACKET EVENT" trigger occurs when the initial packet is received. The IPG timer is used to reduce the sending transmission rate before the queue overflow drop packets caused by congestion.
2. If "FIRST PACKET EVENT" 600 occurs, ZORC Send checks if this event happens within the time interval specified by the current IPG value starting with the last data packet sent. IPG_MISS 602 is defined when the IPG timer has expired but a packet is not available to transmit, at that point IPG_MISS is set to 1. Then when the next packet arrives, it will be sent right away, without waiting an addition IPG time. If IPG_MISS==0 ZORC Send follows main data packet send sequence 604, i.e. continues to wait for the "IPG TIME FIRED" (when the timer expires) event. In case of IPG_MISS==1 it continues directly to sending the data packet to the ZORC Gauge 610.

3. If the "IPG TIMER FIRED" 604 event occurs, ZORC Send process checks if there is a packet ready for transmission 606. If there is nothing to transmit, ZORC Send sets IPG_MISS=1 610 and returns to Step 604.

4. If there is a data packet ready for transmission, ZORC Send checks if IPG_MISS=0 608, i.e. if the time interval between the last sent data packet and current time is within a value specified by the current IPG. If IPG_MISS=0, ZORC Send proceeds to check if the size of the packet to be transmitted is qualified for ZORC IPG measurement—namely, if packet length is > or =Rate Control Qualify length (RCQ_Len) 610.

5. If the data packet is qualified, ZORC Send sets Q-bit=1

6. If either test—608 or 610—returns NO result, ZORC proceeds directly to step 614 to set A-bit=A_CURRENT without setting Q-bit=1.

7. In step 616 ZORC Send resets IPG_MISS to value "0" and proceeds to Step 618 where ZORC Send sends the data packet to the other end of the communication channel and proceeds to 8. Step 620 to set IPG TIMER to current IPG value and returns to the wait Step 604 waiting for the next opportunity to send data packet.

Figure 7:
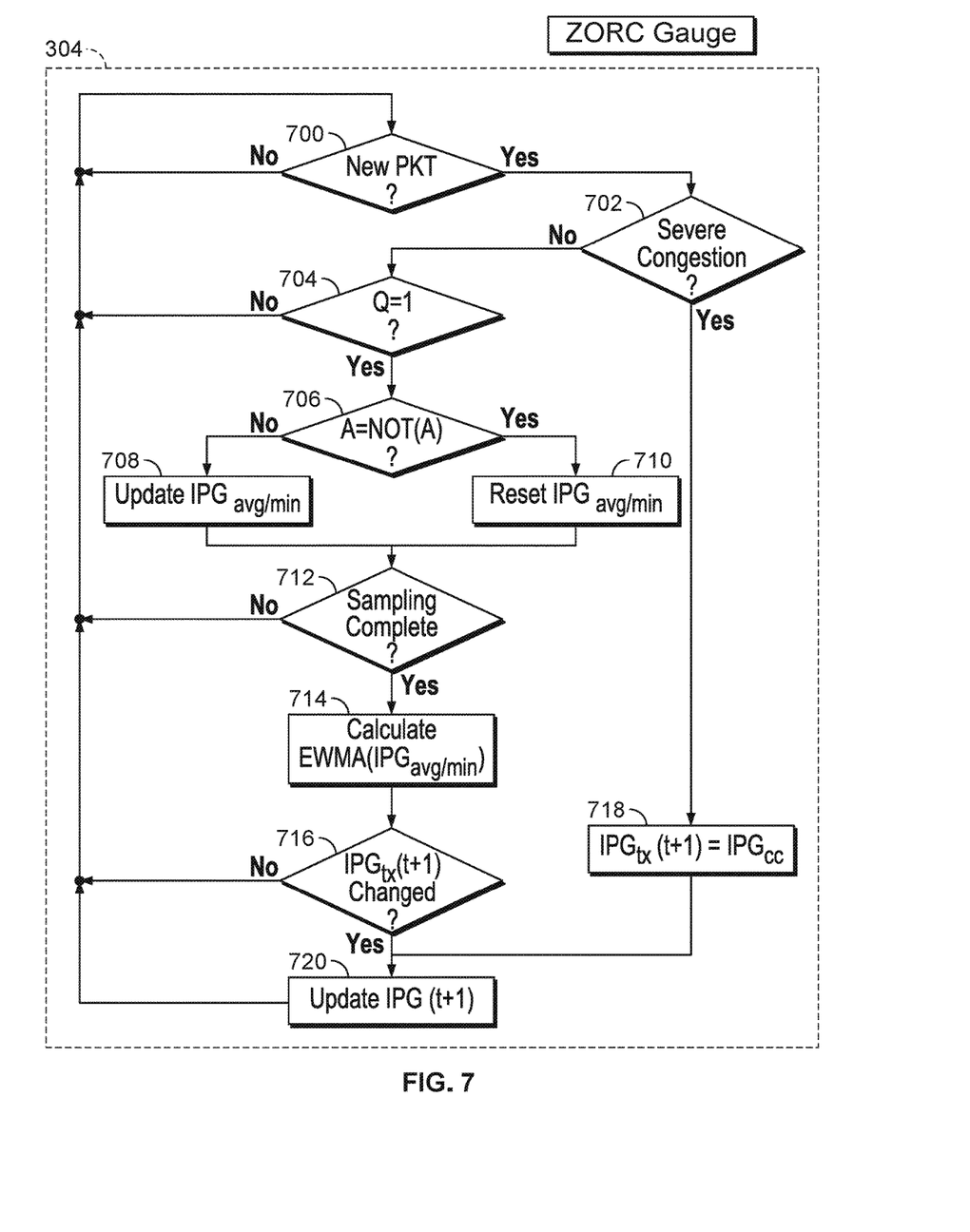
FIG. 7 shows the detailed steps of the ZORC Gauge process shown in FIG. 3.

As shown in FIGS. 2 and 3, all data packets sent by ZORC Send 300 are received by ZORC Gauge 304 in ZORC receiver 204 on the other end of the communication channel. The flow chart describing a preferred embodiment of a processing sequence is shown in FIG. 7. ZORC Gauge 304 is designed to analyze the incoming data packet stream to estimate available ingress communication channel capacity. The process begins with:

1. Step 700 in which the ZORC Gauge 304 process waits for the next ingress data packet. In the next 2. Step 702 ZORC Gauge checks if the ingress channel is experiencing severe congestion—severe congestion is defined as >8 continuous lost packets, in this context out-of-order packets are also treated as lost. If the result is YES, then a congestion control IPG is used 3. In Step 718 to update $IPG_{tx}$ with the congestion control IPG ($IPG_{cc}$), which is computed as $IPG_{cc}=(1+CCStep)\times Max(IPG_{tx}(t), \overline{IPG_{avg}})$, where a pre-defined Congestion Control Step (CCStep) is used to rapidly increase the sending IPG (reduce the sending rate) to avoid congestion collapse and recover from congestion conditions in the network.

4. If no "SEVERE CONGESTION" is detected in Step 702 ZORC Gauge moves to Step 704 to check if the last received packet is qualified for IPG measurement, i.e. if the Q-bit is set to 1? If not—ZORC Gauge process returns to Step 700 to wait for the next ingress data packet. If the data packet is qualified, ZORC Gauge moves to 5. Step 706 to check if A-bit is consistent with the previously received packets, i.e. the ZORC Transmit process did not switch to a different IPG value. If the A-bit did not toggle, ZORC Gauge updates $IPG_{avg}$ and $IPG_{min}$ in Step 708. If the A-bit toggled, ZORC Gauge resets $IPG_{avg}$ and $IPG_{min}$ in Step 710.

6. After passing either Step 708 or 710, ZORC Gauge moves to Step 712 to check if the representative sampling set of IPGs for calculating the available ingress channel capacity is complete. The sample set is defined as either as number of packets or time (in term of RTT). If the sampling interval is not complete, ZORC Gauge returns to the Step 700 to wait to the next ingress data packet. If the Step 712 test shows that the sampling interval is complete, then ZORC Gauge moves to 7. Step 714 to calculate the long term average ($\overline{IPG_{avg}}$) and long-term min ($\overline{IPG_{min}}$) as Exponential Weighted Moving Average (EWMA) of $IPG_{avg}$ and $IPG_{min}$. From this Step, ZORC Gauge moves unconditionally to 8. Step 716 to check if the new calculated $IPG_{tx}$ is different from the one calculated in the previous sampling cycle? If the new $IPG_{tx}$ is the same, ZORC Gauge moves to the Step 700 to wait for the new ingress data packet. If the new $IPG_{tx}$ is different ZORC Gauge moves to 9. Step 720 to update next IPG value with currently calculated $IPG_{tx}$ to adjust the transmission rate. From this Step ZORC Gauge returns to Step 700 to wait for the next ingress data packet.

Figure 8:
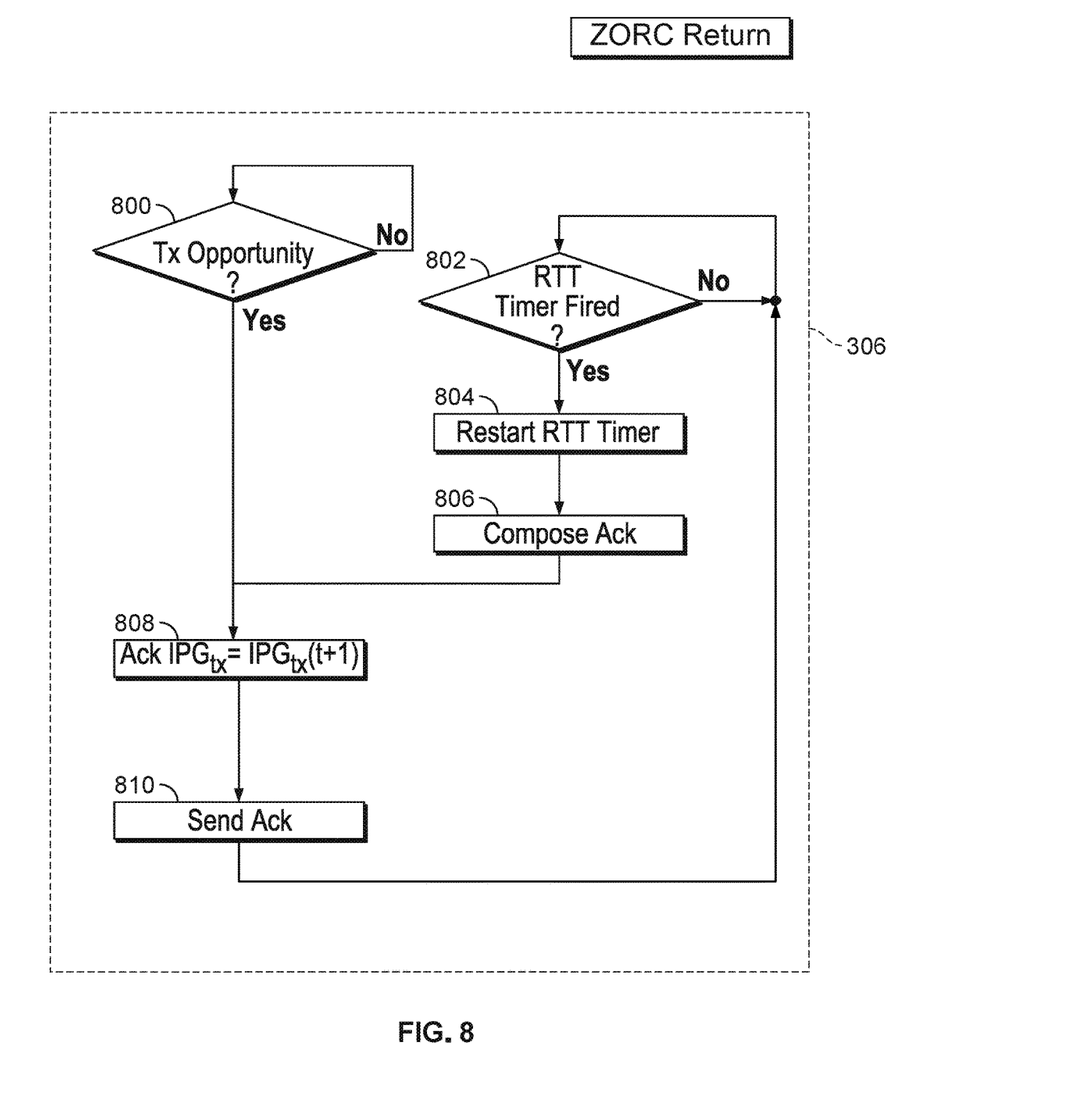
FIG. 8 shows the detailed steps of ZORC RETURN process shown in FIG. 3.

As shown in FIG. 3, ZORC Return 306 process is designed to communicate required IPG value from ZORC Receiver 204 to ZORC Tune 302 process located in ZORC Transmitter 206. In order to send the information ZORC Return uses the ACK traffic generated by ZORC Receiver as confirmation of reception of the incoming data traffic. As shown in FIG. 8 ZORC Return 306 process starts at 1. Step 800 waiting for the opportunity to send IPG information with the next ACK to be sent to ZORC transmitter tuning function 302. When there is such an opportunity, ZORC process 306 moves to 2. Step 808 to update the ACK. $IPG_{tx}$ fields with the current value of $IPG_{tx}$. Then ZORC Return moves to 3. Step 810 to send the ACK to the other end of the communication channel 310 and returns to wait for the next opportunity to transfer IPG data.

4. Alternatively if there is no ACK scheduled for transmission to ZORC transmitter 216, then move to Step 802.

5. Step 802 If the Round Trip Time RTT has passed since the last transmission this causes RTT Timer to fire which moves to Step 804, If the RTT Timer has not fired return to Step 802

6. Step 804 to restart the RTT Timer moving unconditionally to Step 806

7. Step 806 to compose an ACK packet for a sole purpose to transfer IPG information to the ZORC transmitter 216. Immediately after this ZORC Return proceeds to Step 808 as in #2 above to update $IPG_{tx}$ fields and then to Step 810 to transmit the ACK.

As it follows from FIG. 2 ZORC Tune 302 closes the control loop by receiving the new IPG information and updating operative fields for ZORC Send 300.

The processing functions of the transmission apparatus in the foregoing embodiment can be realized in hardware or software. Not only are all of these processing functions realized by the hardware or software, but also part thereof may be realized by using the hardware or software. That is, the combination of the hardware and software may be adopted.

With respect to the foregoing embodiments, various modified examples are conceivable within the scope of the gist of the invention. Besides, various modified examples and applied examples created or combined based on the recitation of the specification are also conceivable. It should be understood by those skilled in the art that various modifications, combinations, sub-combinations and alterations may occur depending on design requirements and other factors. It should be understood that various changes and modifications to the presently preferred embodiments described herein will be apparent to those in the art. Such changes and modifications can be made without departing from the spirit and scope of the present subject matter and without diminishing its intended advantages.

The invention claimed is:

1. A system for communication processing, comprising:
a first transmitter configured to send data packets to a remote device, wherein the remote device includes a second transmitter and a second receiver;
a first receiver configured to receive a transmission rate change request generated by the remote device and sent by the second transmitter and based on a detected change to inter-packet gaps, wherein the transmission rate change request specifies an updated transmitting inter-packet gap value, and the inter-packet gaps have been smoothed using a smoothing function based on one or more of the following: an exponential weighted moving average, a moving average, and a simple average; and
a processor configured to adjust a packet transmission rate of the first transmitter in response to the received the transmission rate change request, wherein adjusting the packet transmission rate includes adjusting the packet transmission rate to target the updated transmitting inter-packet gap value.

2. The system of claim 1, wherein the inter-packet gaps have been smoothed using a smoothing function based on a moving average to reduce oscillation.

3. The system of claim 1, wherein the adjustment of the packet transmission rate is performed at a protocol layer in a communications stack and the protocol layer utilizes one or more of the following protocols: TCP, UDP, and IP.

4. The system of claim 1, wherein the updated transmitting inter-packet gap value was determined based on a channel capacity change calculated based on the inter-packet gaps.

5. The system of claim 1, wherein the updated transmitting inter-packet gap value was selected based on a detection of a congestion of a network channel.

6. The system of claim 5, wherein the detection of the congestion of the network channel is based a detection of a consecutive number of dropped packets.

7. The system of claim 1, wherein the detected change to inter-packet gaps includes a detected long term average inter-packet gap and a detected short term average inter-packet gap.

8. The system of claim 7, wherein the detected change to inter-packet gaps includes a detected short-term current inter-packet gap.

9. The system of claim 8, wherein the updated transmitting inter-packet gap value was determined based on a comparison of the detected long term average inter-packet gap and the detected short-term current inter-packet gap.

10. A system for communication processing, comprising:
a first receiver configured to receive data packets from a remote device, wherein the remote device includes a second transmitter and a second receiver;
a first transmitter configured to send a transmission rate change request, wherein the transmission rate change request specifies an updated transmitting inter-packet gap value and the remote device adjusts a packet transmission rate to target the updated transmitting inter-packet gap value in response to the transmission rate change request; and
a processor configured to generate the transmission rate change request and calculate the updated transmitting inter-packet gap value based on a detected change to inter-packet gaps, wherein the updated transmitting inter-packet gap value is determined based on a channel capacity change calculated based on the inter-packet gaps.

11. The system of claim 10, wherein the inter-packet gaps have been smoothed using a smoothing function based on one or more of the following: an Exponential Weighted Moving Average, a moving average, and a simple average.

12. The system of claim 10, wherein the inter-packet gaps have been smoothed using a smoothing function based on a moving average to reduce oscillation and achieve stable tracking of capacity.

13. The system of claim 10, wherein the updated transmitting inter-packet gap value was selected based on a detection of a congestion of a network channel.

14. The system of claim 13, wherein the detection of the congestion of the network channel was based a detection of a consecutive number of dropped packets.

15. The system of claim 10, wherein the detected change to inter-packet gaps includes a detected long term average inter-packet gap and a detected short term average inter-packet gap.

16. The system of claim 15, wherein the detected change to inter-packet gaps includes a detected short-term current inter-packet gap.

17. The system of claim 16, wherein the updated transmitting inter-packet gap value was determined based on a comparison of the detected long term average inter-packet gap and the detected short-term current inter-packet gap.

18. A method for communication processing, comprising:
sending data packets to a remote device, wherein the remote device includes a second transmitter and a second receiver;
receiving a transmission rate change request generated by the remote device and sent by the second transmitter and based on a detected change to inter-packet gaps, wherein the transmission rate change request specifies an updated transmitting inter-packet gap value and the updated transmitting inter-packet gap value was determined based on a detection of a congestion of a network channel; and
using a processor to adjust a packet transmission rate of the first transmitter in response to the received the transmission rate change request, wherein adjusting the packet transmission rate includes adjusting the packet transmission rate to target the updated transmitting inter-packet gap value.

19. The method of claim 18, wherein the inter-packet gaps have been smoothed using a smoothing function based on one or more of the following: an exponential weighted moving average, a moving average, and a simple average.

20. The method of claim 18, wherein the updated transmitting inter-packet gap value was determined based on a channel capacity change calculated based on the inter-packet gaps.

* * * * *